US012674550B1

(12) United States Patent
Bonn

(10) Patent No.: US 12,674,550 B1
(45) Date of Patent: Jul. 7, 2026

(54) PUMP-OUT VALVE

(71) Applicant: VJ Systems, LLC, Hilliard, OH (US)

(72) Inventor: John W. Bonn, Hilliard, OH (US)

(73) Assignee: VJ Systems, LLC, Hilliard, OH (US)

( * ) Notice: Subject to any disclaimer, the term of this patent is extended or adjusted under 35 U.S.C. 154(b) by 0 days.

(21) Appl. No.: 19/545,553

(22) Filed: Feb. 20, 2026

Related U.S. Application Data

(60) Provisional application No. 63/760,826, filed on Feb. 20, 2025.

(51) Int. Cl.
*F17C 13/02* (2006.01)
*F16K 37/00* (2006.01)

(52) U.S. Cl.
CPC .......... *F17C 13/025* (2013.01); *F16K 37/005* (2013.01)

(58) Field of Classification Search
CPC ...... F17C 13/025; F16K 37/005; Y02T 10/40; A61M 1/74; G06Q 50/02; H10P 72/78; B60W 10/06; B25J 15/0625; B25J 15/0616; G01D 11/245; G01D 21/02; G01D 18/00; F25B 2700/1933; F25B 2700/1931; F25B 49/022; G01M 3/02; G01M 3/2876; G01F 15/005; B05D 3/0493
See application file for complete search history.

(56) References Cited

U.S. PATENT DOCUMENTS

| | | | | |
|---|---|---|---|---|
| 2013/0255802 | A1* | 10/2013 | Minnock | E21B 33/0355 |
| | | | | 251/30.01 |
| 2013/0267919 | A1* | 10/2013 | Caso | A61M 1/74 |
| | | | | 604/319 |
| 2018/0080440 | A1* | 3/2018 | Domke | F25B 49/022 |

FOREIGN PATENT DOCUMENTS

JP      2018085317 A   *   5/2018        F16K 1/54

* cited by examiner

*Primary Examiner* — Laura Martin
*Assistant Examiner* — Anthony W Megna Fuentes
(74) *Attorney, Agent, or Firm* — Thomas E. Lees, LLC

(57) ABSTRACT

A pump-out valve for a structure comprises a valve body, a plug assembly, and an operator that removably couples to the valve body. The plug assembly includes a plug corresponding to a seal of the valve body and a vacuum gauge. The operator includes a housing, an actuator, a piston, and an outlet passage. The actuator is actionable to couple the piston to the plug assembly in a first position to allow a user to set the pump-out valve to a sealed state by moving the plug assembly such that the plug assembly engages the seal of the valve body and set the pump-out valve to an open state by removing the plug from the seal of the valve body. The actuator is further actionable to decouple the piston from the plug in a second position to allow the operator to be removed from the valve body.

18 Claims, 11 Drawing Sheets

PUMP-OUT VALVE

CROSS REFERENCE TO RELATED APPLICATIONS

This application claims the benefit of U.S. Provisional Patent Application Ser. No. 63/760,826 filed Feb. 20, 2025, entitled "PUMP-OUT VALVE", by Bonn the disclosure of which is hereby incorporated by reference.

BACKGROUND

Various aspects of the present disclosure relate generally to check valves and more specifically to pump-out valves to be used in a cryogenic environment.

In cryogenic systems, if a leak of cryogenic fluid occurs, the cryogenic fluid may expand to a gas state, which is about seven-hundred times a volume of a same amount of the cryogenic fluid in a liquid state. If the cryogenic fluid in liquid phase leaks into a vacuum space, it will warm up and expand causing a large pressure increase, which will increase the pressure in the vacuum space. If there is no way of relieving the pressure buildup, a vacuum jacket covering the vacuum space could fail or explode. A pump out valve is designed to vent the increased pressure in the vacuum space to eliminate any catastrophic failure.

There are two relief concepts used for pump-out valves: a cork type and a spring-loaded vent type. The cork type includes a plug that discharges from the valve body if there if an over pressurization of the vacuum space. The spring-loaded vent type includes a plug that is spring loaded and will open on over pressurization but will retract and close when the pressure is reduced below the spring rate of the spring. The plug will not be discharged from the assembly.

BRIEF SUMMARY

According to aspects of the present disclosure, a pump-out valve for a structure comprises a valve body, a plug assembly, and an operator that removably couples to the valve body. The valve body includes a seal. The plug assembly includes a plug corresponding to the seal of the valve body, and a vacuum gauge coupled to the plug. The operator includes a housing, an actuator, a piston, and an outlet passage. The actuator is actionable to couple the piston to the plug assembly in a first position to allow for a user to use the actuator to set the pump-out valve to a sealed state by moving the plug assembly such that the plug assembly engages the seal of the valve body, and set the pump-out valve to an open state by removing the plug from the seal of the valve body. The actuator is further actionable to decouple the piston from the plug in a second position to allow the operator to be removed from the valve body while the pump-out valve is in the sealed state.

DETAILED DESCRIPTION

Figure 1:
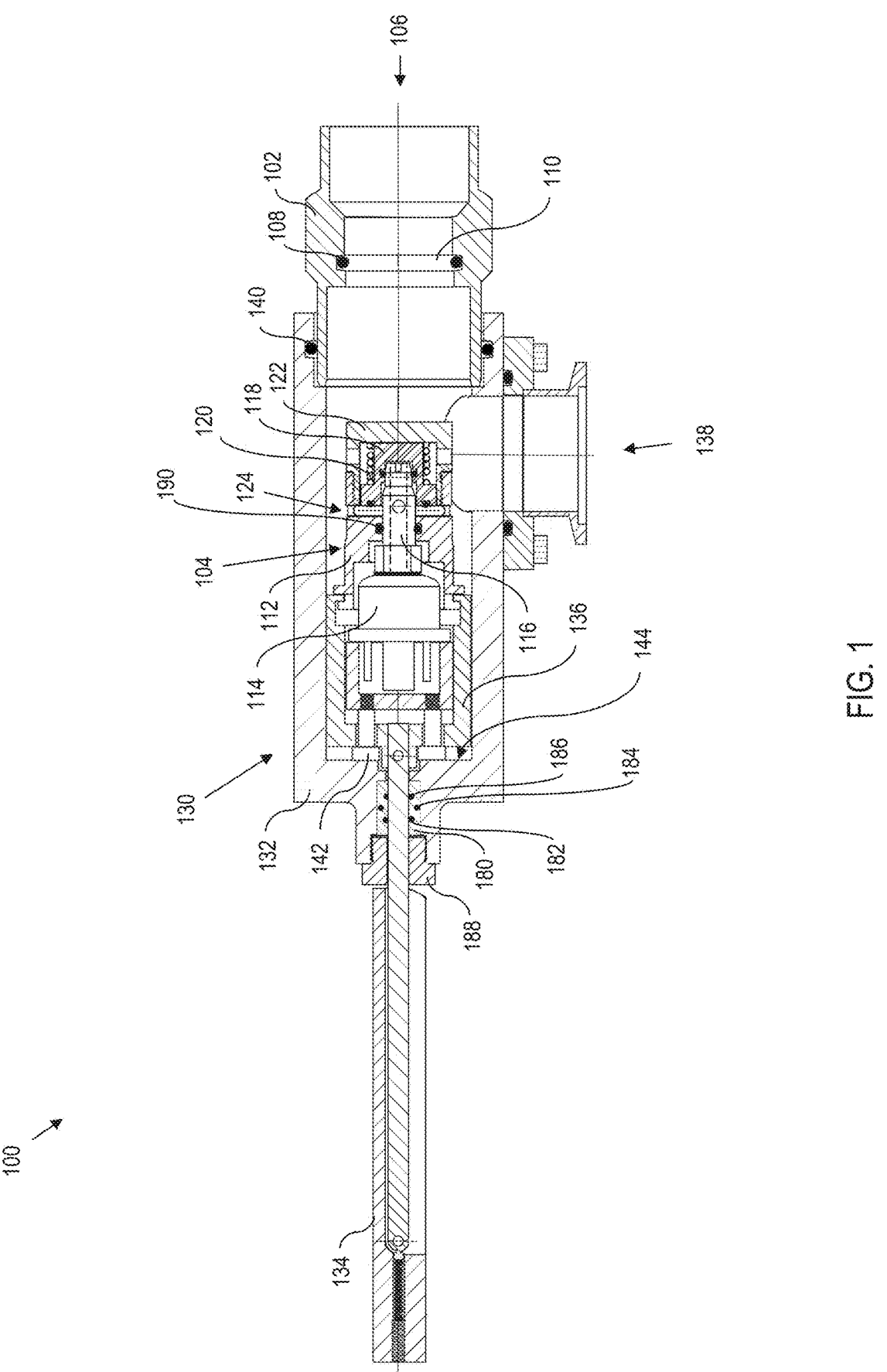
FIG. 1 is a schematic drawing of a cork-type pump-out valve with an internal vacuum gauge, with an operator attached, and in an open state and a pressure-reading state, according to various aspects of the present disclosure.

Various aspects of the present disclosure relate generally to pump-out valves. More particularly, aspects relate herein to pump-out valves for use in industrial cryogenic environments. These pump-out valves relieve pressure that may build up in a system when cryogenic fluid leaks and expands to a much larger volume. To determine a pressure within the pump-out valve, existing solutions use an external vacuum gauge (i.e., a pressure gauge that includes determining pressures below atmospheric pressure and above atmospheric pressure) that reads the pressure inside a vacuum space in the pump-out valve (which matches the pressure inside the cryogenic system). However, these external vacuum gauges require a housing or other materials for protection from the environment and sometimes get damaged from the industrial environment.

Other existing solutions include a connection that allows a user to attach a vacuum gauge that reads the pressure inside the valve. However, these vacuum-gauge connectors sometimes get damaged, as they are within the industrial environment.

According to aspects of the present disclosure, pump-out valves are equipped with a vacuum gauge within the plug. In some embodiments, the internal vacuum gauge includes a wireless transmitter (or a connection to a wireless transmitter) that allows the vacuum gauge to send pressure information to a remote location over a wireless network.

The pressure information can be sent periodically or continuously over the wireless network. Thus, once the pump-out valve is installed in the cryogenic system, there is no need to attach an external vacuum gauge to get pressure readings from inside the system.

In various embodiments, the internal vacuum gauge can be read by a user who attaches a device to the pump-out valve when the pump-out valve is in either an open state (venting/evacuating) or a closed state. When manually reading the internal vacuum gauge, an outside force acts upon the vacuum gauge (via removing a cap and pushing on the vacuum gauge, pushing on the cap (e.g., via threading, pushing in, etc.) which pushes the vacuum gauge, using a mechanism in an operator of the pump-out valve (after connecting the operator), etc.) to push the vacuum gauge and subsequent components to allow pressure from the cryogenic system to reach the vacuum gauge.

In numerous embodiments, the internal vacuum gauge is inside a plug of the pump-out valve, and the plug includes an aperture that allows pressure from outside the plug (e.g., pressure from the cryogenic environment) to enter the plug, so the vacuum gauge can read the pressure of the system. The aperture may be a normally-closed/forced-open aperture, where a vacuum-gauge-tube holder closes the aperture until a force acts upon the vacuum gauge to move the vacuum gauge, which also moves the vacuum-gauge-tube holder to expose the aperture to allow pressure to reach the vacuum gauge.

The internal vacuum gauge is protected from harsh environments while inside the pump-out valve, which provides vast improvements over current solutions.

Turning now to the figures and in particular to FIG. 1, a pump-out valve 100 includes a valve body 102 and a plug assembly 104. The valve body 102 includes an inlet passage 106 and a seal 108 (other seals herein are also denoted by solid dots in the figures) within a recess 110 of the valve body 102. The valve body 102 couples to an associated cryogenic system via an inlet passage 106 such that pressure from the cryogenic system enters the pump-out valve 100 through the inlet passage 106 of the valve body 102. In many embodiments, the seal 104 is an O-ring that loops around the inlet passage 106 to engage the plug assembly 104.

Further, the plug assembly 104 includes a plug 112, a vacuum gauge 114 including a tube 116, a vacuum-gauge-tube holder 118, a spring 120, and a spring retainer 122. The plug 112 corresponds to the seal 108 of the valve body 102 such that when the plug 112 is engaged with the seal 108, the pump-out valve is set to a sealed state. As shown in FIG. 1, the plug 112 is not engaged with the seal 108 of the valve body 102, which means that the pump-out valve 100 is in an open state (sometimes called an evacuation state or a venting state). While referred to as a vacuum gauge herein, the vacuum gauge may be any pressure sensor, even if measuring above atmospheric pressure.

The vacuum gauge 114 is located within the plug assembly 104 and is isolated from the corresponding cryogenic system by the plug 112—except for an aperture 124 within the plug. The vacuum tube holder 118 surrounds the tube 116 of the vacuum gauge 114 to protect the tube 116 and to prevent pressure (and other things) from the cryogenic system from contacting the vacuum gauge 114 by being interposed between the aperture 124 and the tube 116. However, when a force acts upon the vacuum gauge 114 to push the vacuum gauge 114 (to the right in FIG. 1), then the vacuum tube holder 118 moves to the right with the vacuum gauge 114 and is no longer interposed between the aperture 124 and the vacuum gauge 114. Thus, pressure from the cryogenic system is exposed to the vacuum gauge 114 when the vacuum gauge 114 is pushed in with reference to the plug 112, which remains stationary while the vacuum gauge 114 is pushed in. When the vacuum gauge 114 is exposed to pressure from the cryogenic system, the pump-out valve is in a pressure-reading state.

When no force acts upon the vacuum gauge 114, the spring 120 biases the tube holder 118 to be interposed between the aperture 124 and the vacuum-gauge tube 116, placing the pump-out valve in a non-pressure-reading state. The spring retainer 122 provides a surface that allows the spring 120 to bias the tube holder 118 and provides protection to the spring 120 and spring retainer 122.

Note that the placement of the plug assembly 104 (i.e., the open/venting/evacuation state versus the sealed state) is independent of the reading state (i.e., pressure-reading state versus non-pressure-reading state). For example, the pump-out valve 100 can be in an open state and a pressure-reading state (as shown in FIG. 1). As another example, the pump-out valve 100 can be in an open state and a non-pressure-reading state. Moreover, the pump-out valve 100 can be in a sealed state and a non-pressure-reading state. Further, the pump-out valve 100 can be in a sealed state and a pressure-reading state.

The pump-out valve 100 also includes a removable operator 130 that removably couples to the valve body 102. The operator includes a housing 132 that couples to the valve body 102, an actuator 134 coupled to the housing 132, a piston 136 that removably couples to the plug 112 of the plug assembly, and an outlet passage 138 in the housing 132. Further, a seal 140 on the operator 130 interfaces with the valve body 102 to prevent substances from leaving the housing 132 anywhere except the outlet passage 138. As shown in FIG. 1, the pump-out valve 100 is in the open state, so any substance forced into the inlet passage 106 passes into the operator 130 and then out the outlet passage 138.

In some embodiments, the operator 130 further includes a compressor 142 that abuts against an inside wall 144 of the operator 130 when the pump-out valve 100 is in the open state. When the compressor 142 engages the wall 144, the compressor 142 applies a force on the vacuum gauge 114 to place the pump-out valve 100 in the pressure-reading state (as shown in FIG. 1). Further, in several embodiments, the operator 130 includes a spool 180 that creates a vacuum seal via three seals 182, 184, 186 (e.g., O-rings) in the spool. In those embodiments, the operator 130 further includes a spool retainer 188 to keep the spool 180 in place. Moreover, in various embodiments, a seal 190 (e.g., an O-ring) seals a gap between the plug 112 and the tube 116.

Figure 2:
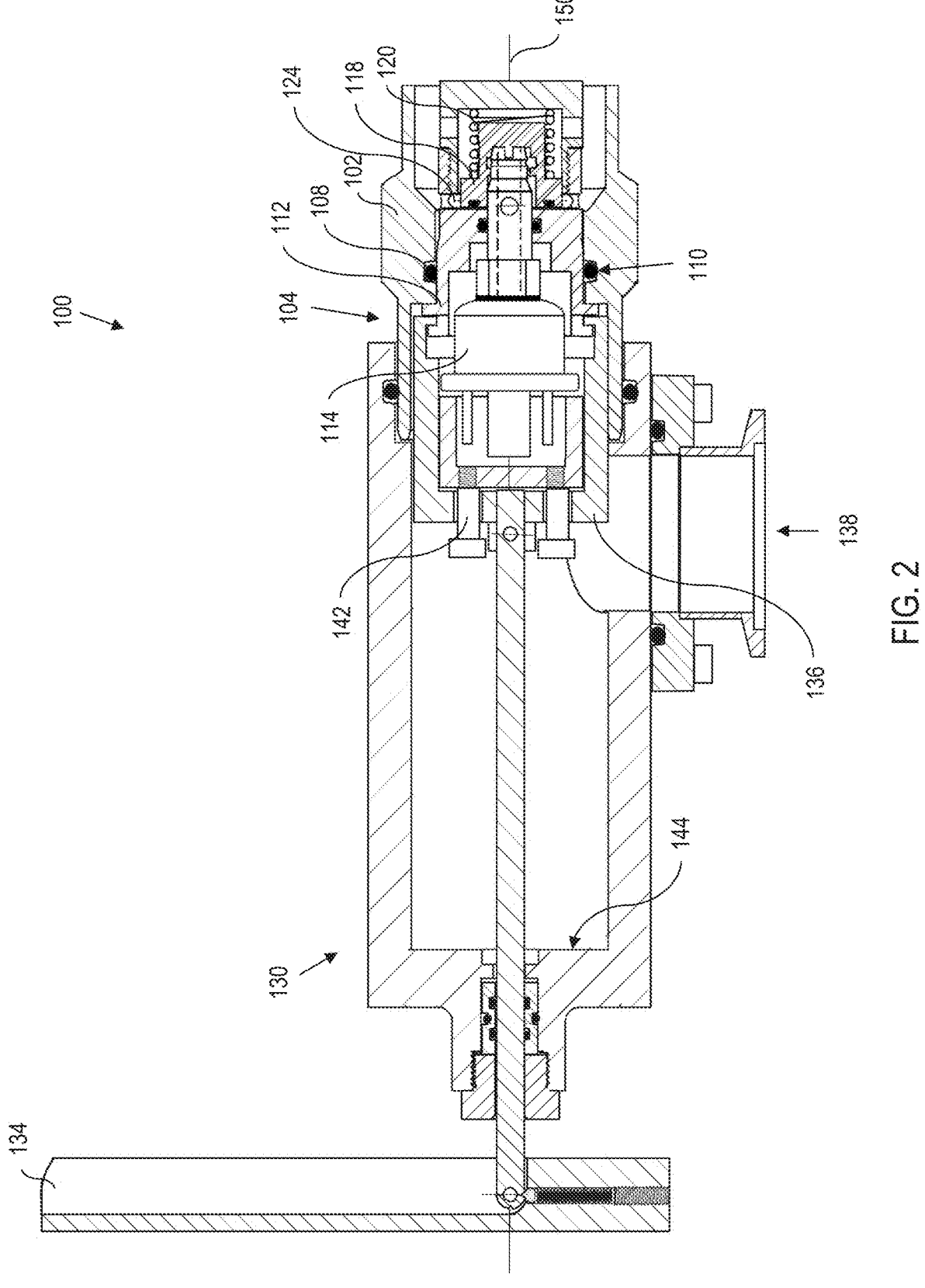
FIG. 2 is a schematic drawing of a cork-type pump-out valve with an internal vacuum gauge, with an operator attached, and in a sealed state and a non-pressure-reading state, according to various aspects of the present disclosure.

FIG. 2 illustrates the pump-out valve 100 with the operator 130 coupled to the valve body 102, similar to FIG. 1. However, in FIG. 2, the actuator 134 of the operator 130 is adjusted to a position to set the pump-out valve 100 to the sealed state by moving the plug assembly 104 such that the plug assembly 104 engages the seal 108 of the valve body 102. Thus, substances, pressure, etc. are blocked from passing from the inlet passage 106 to the outlet passage 138. The actuator 134 of the operator 130 may also be used to set the pump-out valve 100 to the open state by removing the plug from the seal of the valve body.

Further, as the compressor 142 is no longer against the wall 144, there is no force acting upon the vacuum gauge 114, so the spring 120 biases the vacuum-gauge-tube holder 118 to block the aperture 124 of the plug 112 from allowing pressure to the vacuum gauge 114. Thus, in FIG. 2, the pump-out-valve 100 is in a sealed state and a non-pressure-reading state.

To remove the operator 130, a user rotates the actuator about an axis 150 of the pump-out valve 100 to decouple the piston 136 from the plug 112. Then the user can remove the operator 130 such that the pump-out valve 100 is in the sealed state.

Figure 3:
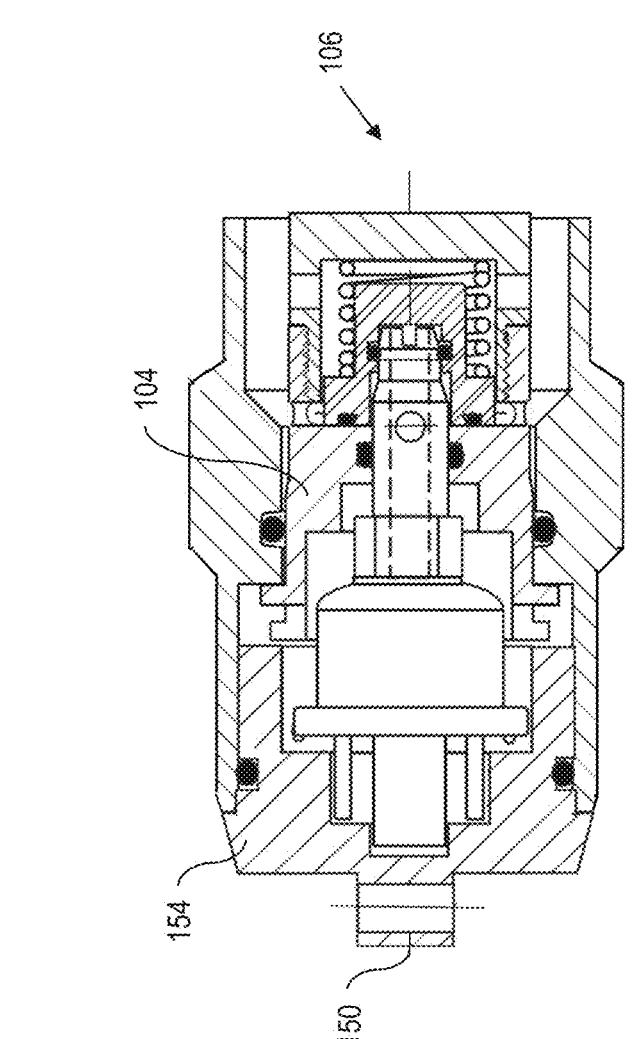
FIG. 3 is a schematic drawing of a cork-type pump-out valve with an internal vacuum gauge, with an operator removed, and in a sealed state and a non-pressure-reading state, according to various aspects of the present disclosure.

FIG. 3 illustrates the pump-out valve 100 in the sealed state and a non-pressure-reading state, similar to FIG. 2, except the operator has been removed and a cap 154 has been placed over the plug assembly 104 to protect the plug assembly 104 when the operator is removed. As shown in FIG. 3, the pump-out valve 100 is a cork-type valve, where the plug assembly 104 is allowed to discharge from the valve body 102 when pressure in the inlet passage 106 (and thus the pressure from the corresponding cryogenic system) exceeds a threshold. A lanyard or some other device prevents the plug assembly 104 and the cap 154 from being discharged far away from the valve body 102. When a user wants to manually vent the pump-out valve 100 (i.e., place the pump-out valve in an evacuation state), the user removes the cap 154, couples the operator to the valve body 102, rotates the actuator of the operator about the axis 150 to engage the piston with the plug assembly 104, and activates the actuator to disengage the plug assembly 104 from the valve body 102 (as shown in FIG. 1).

Figure 4:
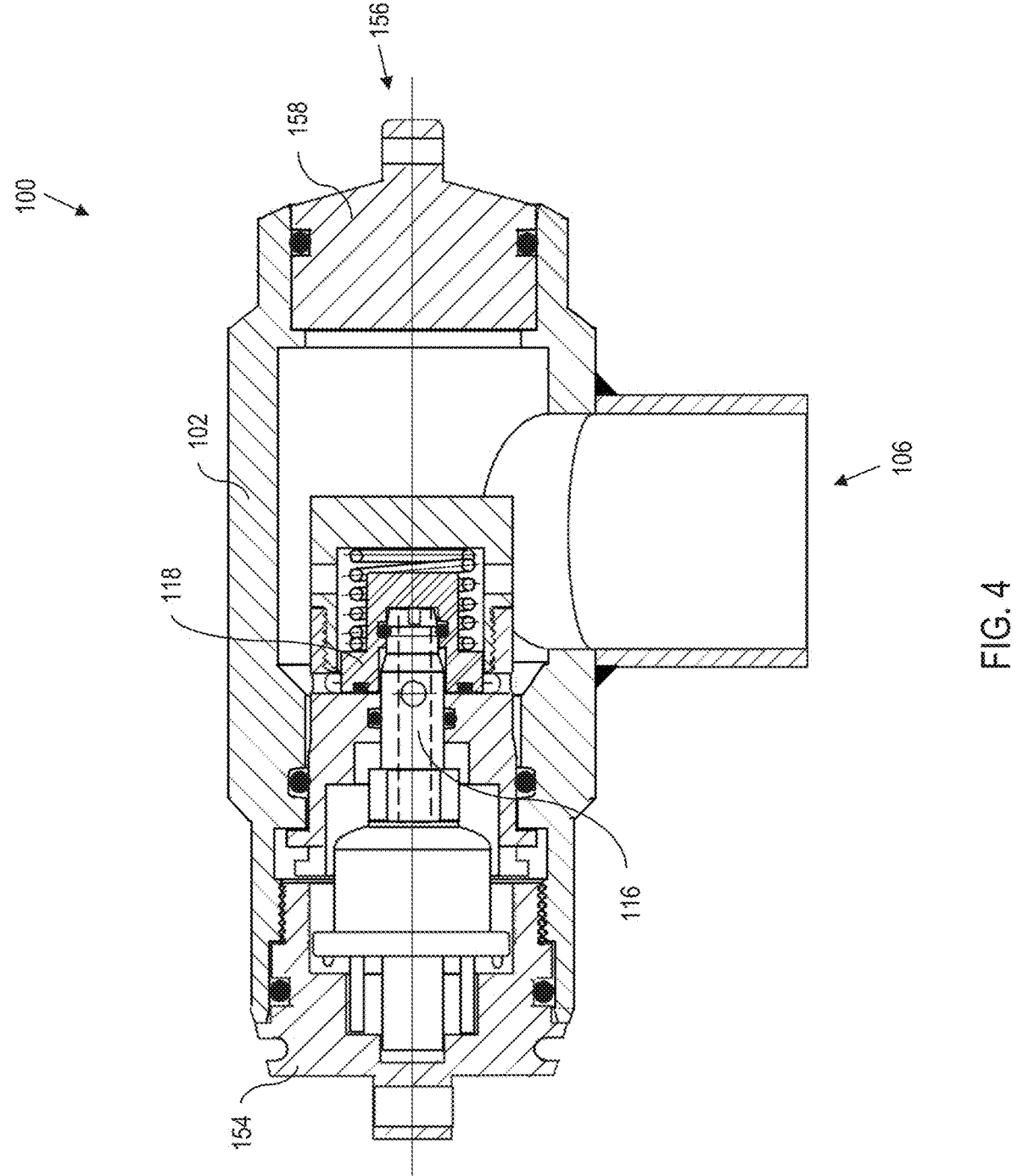
FIG. 4 is a schematic drawing of a pump-out valve with an internal vacuum gauge, with an operator removed, and in a sealed state and a pressure-reading state, according to various aspects of the present disclosure.

FIG. 4 illustrates a vent type embodiment of the pump-out valve 100 (as opposed to the cork type embodiment of FIGS. 1-3). While this is a different embodiment, the inner workings of the valve body 102 and plug assembly 104 work the same. Instead, the inlet passage 106 extends radially from the axis 150 (as opposed to axially in FIGS. 1-3), and the valve body 102 includes an outlet passage 156 (different than the outlet passage in the operator) is opposite the plug assembly 104 and covered by a second cap 158. The cap 154 may be a threaded cap to thread onto a corresponding threaded portion of the valve body 102.

When pressure in the inlet passage 106 rises above a threshold, the second cap 158 discharges and allows fluid to escape (note this is an opposite direction of the discharge direction in FIGS. 1-3). In other words, the plug assembly 104 does not leave the valve body 102 during a discharge. To prevent the second cap 158 from expelling during an overpressure venting, a device (e.g., a lanyard) ties the second cap 158 to an outside of the valve body 102. However, during an intentional venting (i.e., evacuation), the user will use the operator (130, FIGS. 1-2) in the manner described in FIGS. 1-3. As shown in FIG. 4, the valve is in a sealed state and a pressure-reading state (i.e., the vacuum-gauge-tube holder 118 has been pushed to allow pressure to reach the vacuum-gauge tube 116.

Figure 5:
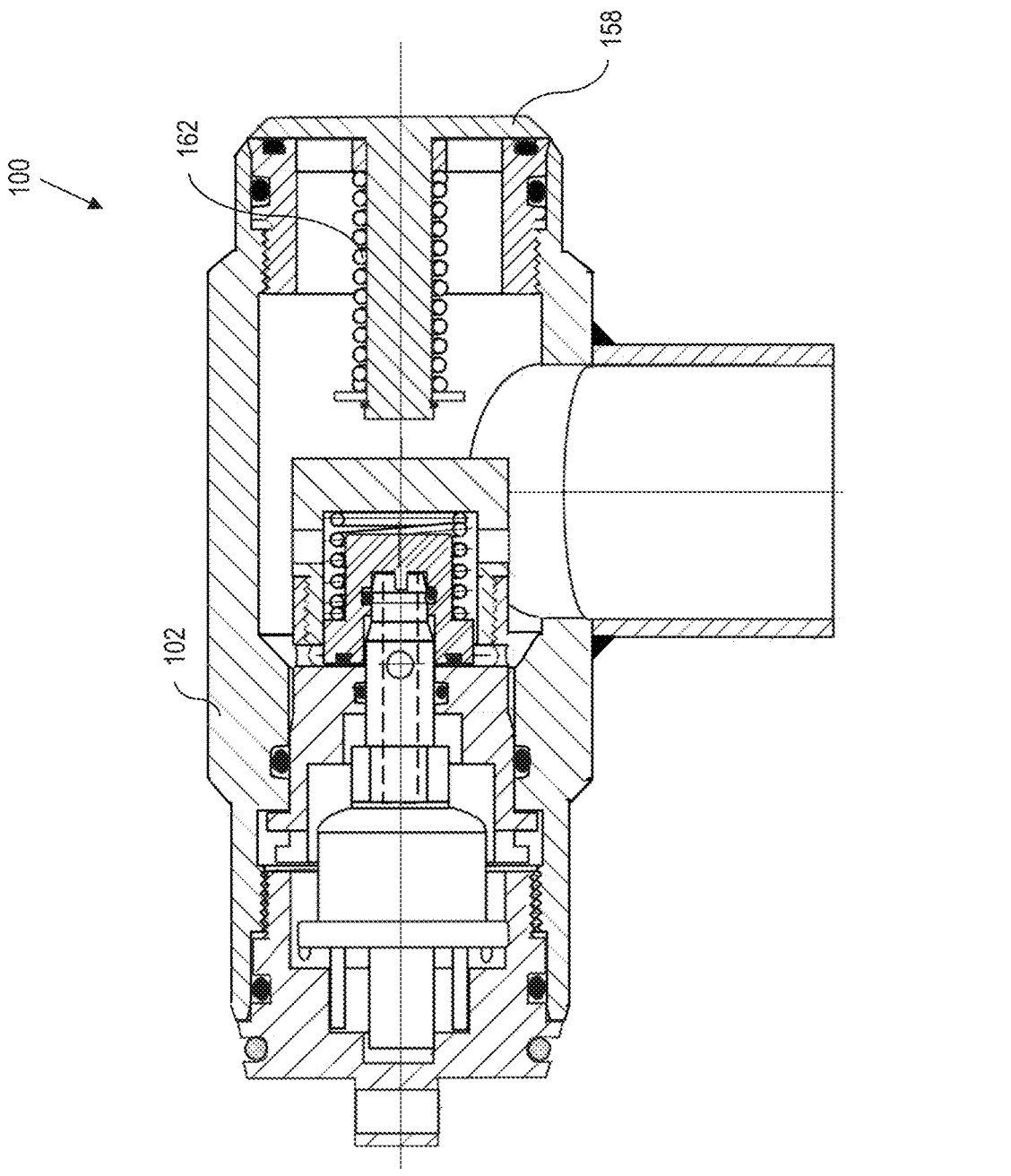
FIG. 5 is a schematic drawing of a spring-venting type pump-out valve with an internal vacuum gauge, with an operator removed, and in a sealed state and a non-pressure-reading state, according to various aspects of the present disclosure.

Turning now to FIG. 5, the pump-out valve 100 is a spring-loaded vent-type pump-out valve 100. The pump-out valve works identically to the vent-type valve of FIG. 4, except the retaining device is an internal spring 162 that prevents the second cap 158 from expelling from the valve body 102. Instead, the internal spring 162 allows the cap to disconnect from the valve body during an overpressure venting by allowing gas to escape and then return to place without need for a manual connection when the overpressure venting is done. As shown in FIG. 5, the pump-out valve 100 is in a sealed state and a non-pressure-reading state.

Figure 6:
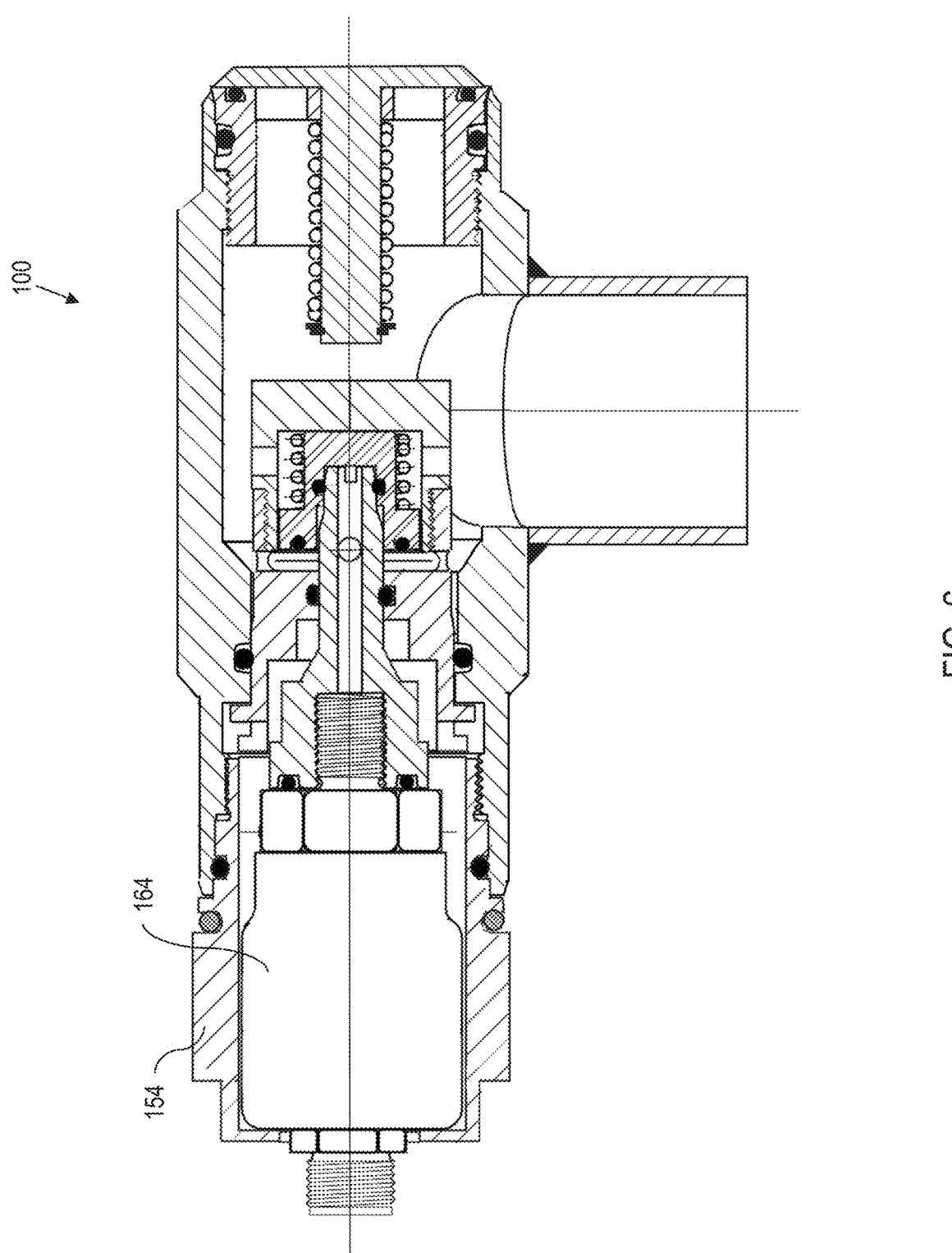
FIG. 6 is a schematic drawing of a spring-venting type pump-out valve with an operator removed, with a wireless transmitter for an internal vacuum gauge, and in a sealed state and a pressure-reading state, according to various aspects of the present disclosure.

FIG. 6 illustrates the pump-out valve 100 with an enclosure 164 for housing a wireless transmitter for sending data (i.e., information) from the vacuum gauge (also within the enclosure 164) to a remote location via a network. In some embodiments, the pump-out valve 100 is kept in the pressure-reading state due to the cap 154 applying a force to the vacuum gauge, which allows the wireless transmitter to constantly or periodically send the pressure data to a remote location (e.g., a remote server). The remote location may receive pressure data from many pump-out valves to give an overall look at the system or industrial environment. In some embodiments, when the pressure inside a pump-out valve 100 surpasses a threshold (which is lower than an overpressure venting threshold), an alarm may sound to alert a user to perform a manual evacuation using an operator, as described above.

Figure 7:
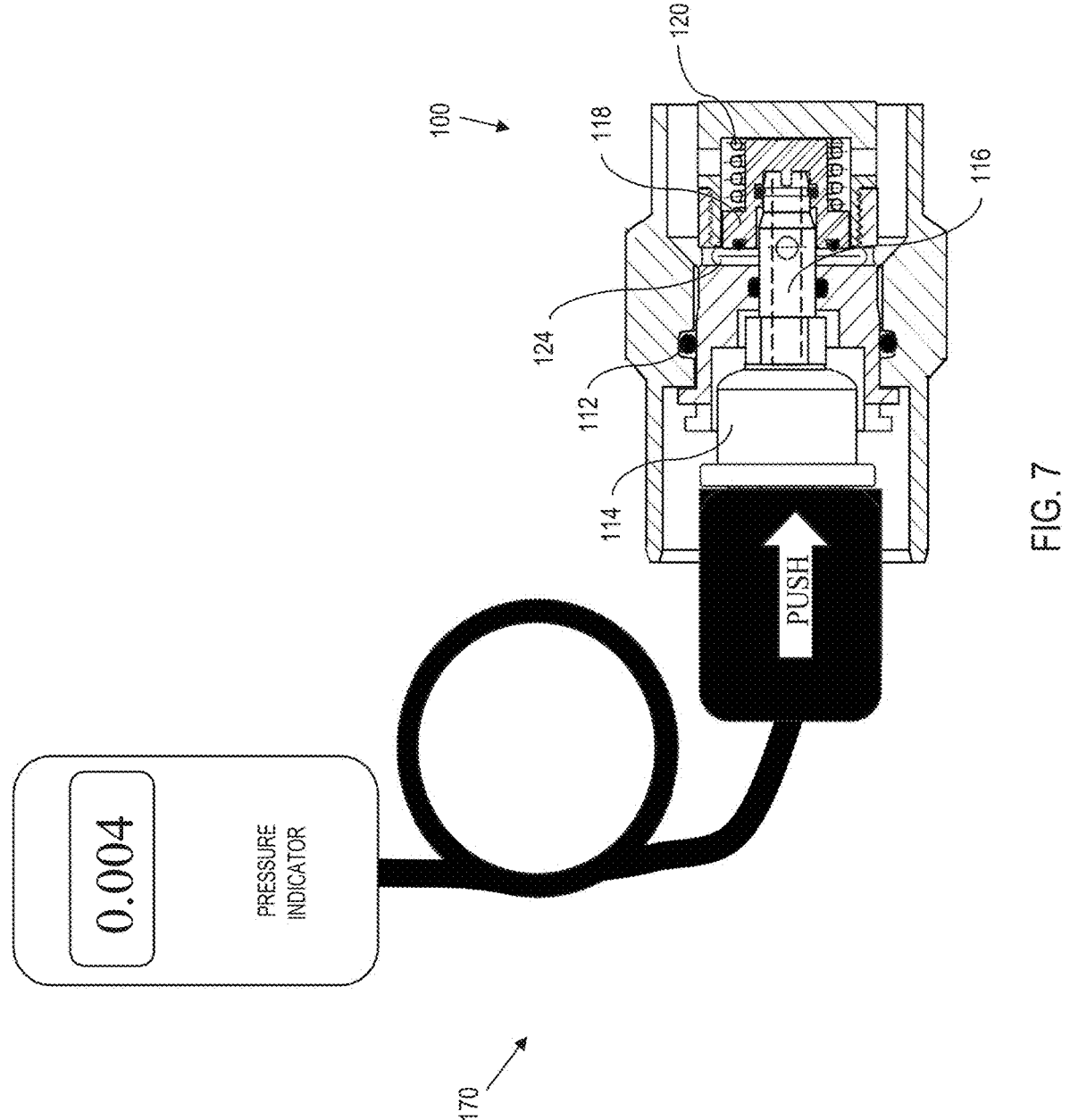
FIG. 7 is a schematic drawing of a pump-out valve in a sealed state with a vacuum meter attached, which places the pump-out valve in a pressure-reading state, according to various aspects of the present disclosure.

FIG. 7 illustrates a pressure indicator (e.g., a vacuum meter) 170 coupled to the pump-out-valve 100. To do so, the cap (154, FIG. 3) is removed, and the vacuum meter 170 is placed on the vacuum gauge 114. The user pushes the vacuum gauge 114 to place the pump-out valve 100 in the pressure-reading state (by pushing the vacuum tube holder 118 such that the aperture 124 in the plug 112 allows gas/pressure to the vacuum gauge 114 (specifically the vacuum-gauge tube 116), as discussed above). After the user gets a vacuum reading, the vacuum meter 170 is removed, and the spring 120 biases the vacuum-tube holder back to prevent gas/pressure from flowing through the aperture 124 to the vacuum gauge 114.

Figure 8:
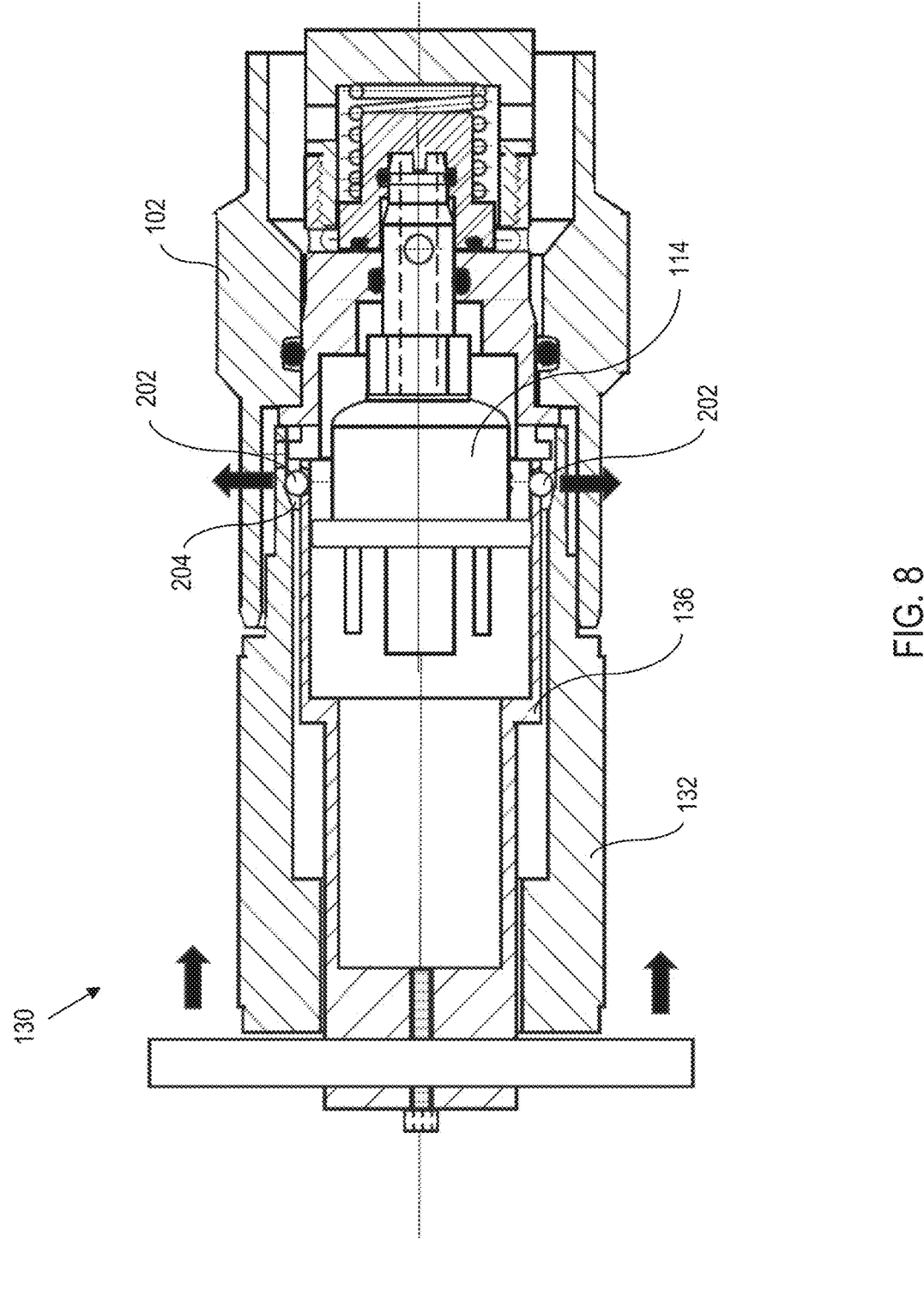
FIG. 8 is drawing illustrating an embodiment of the pump-out valve with ball bearings used to grip the vacuum gauge during extraction in a first step, according to various aspects of the present disclosure.
Figure 9:
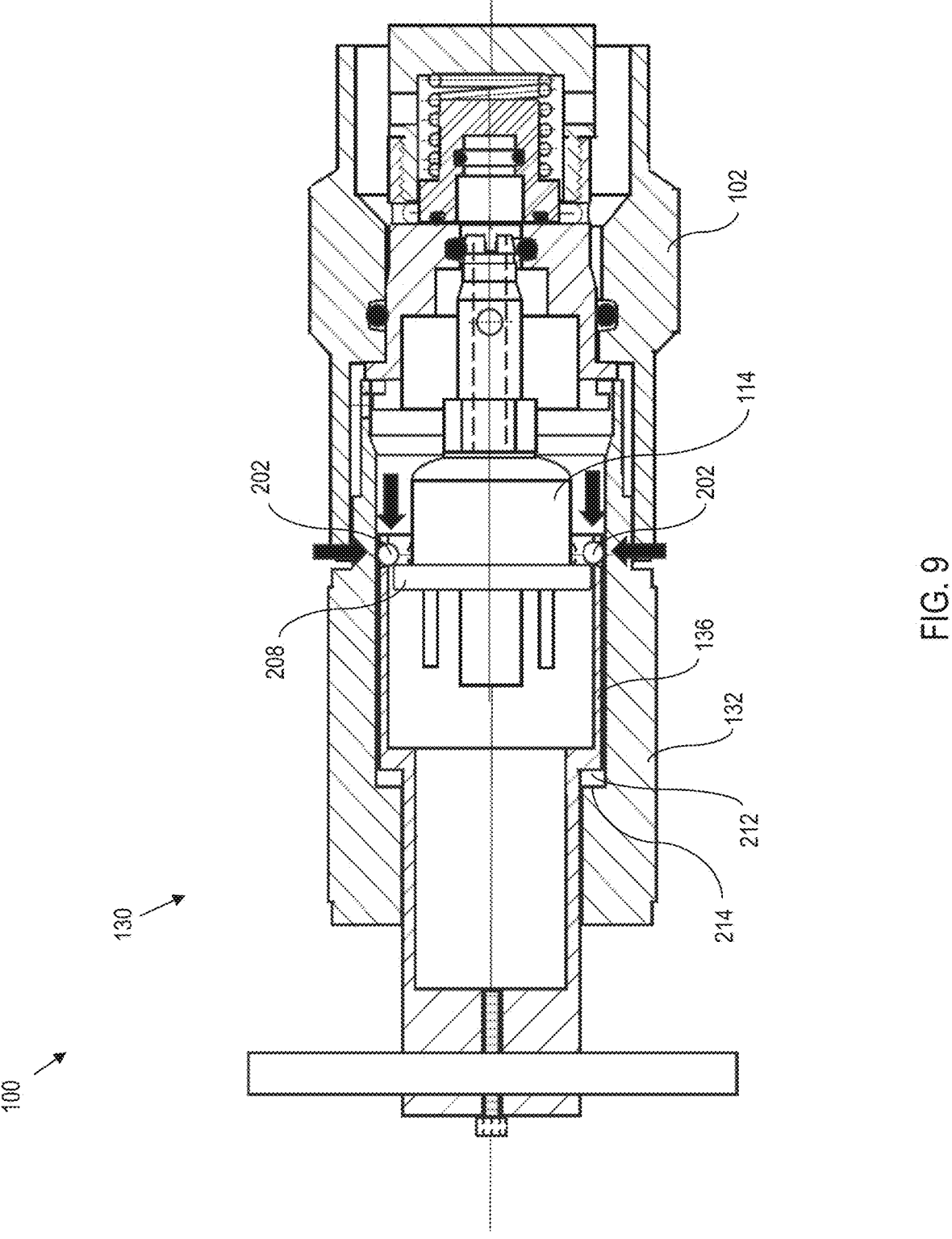
FIG. 9 is a drawing the pump-out valve of FIG. 8, where the ball bearings are gripping the vacuum gauge during extraction, according to various aspects of the present disclosure.
Figure 10:
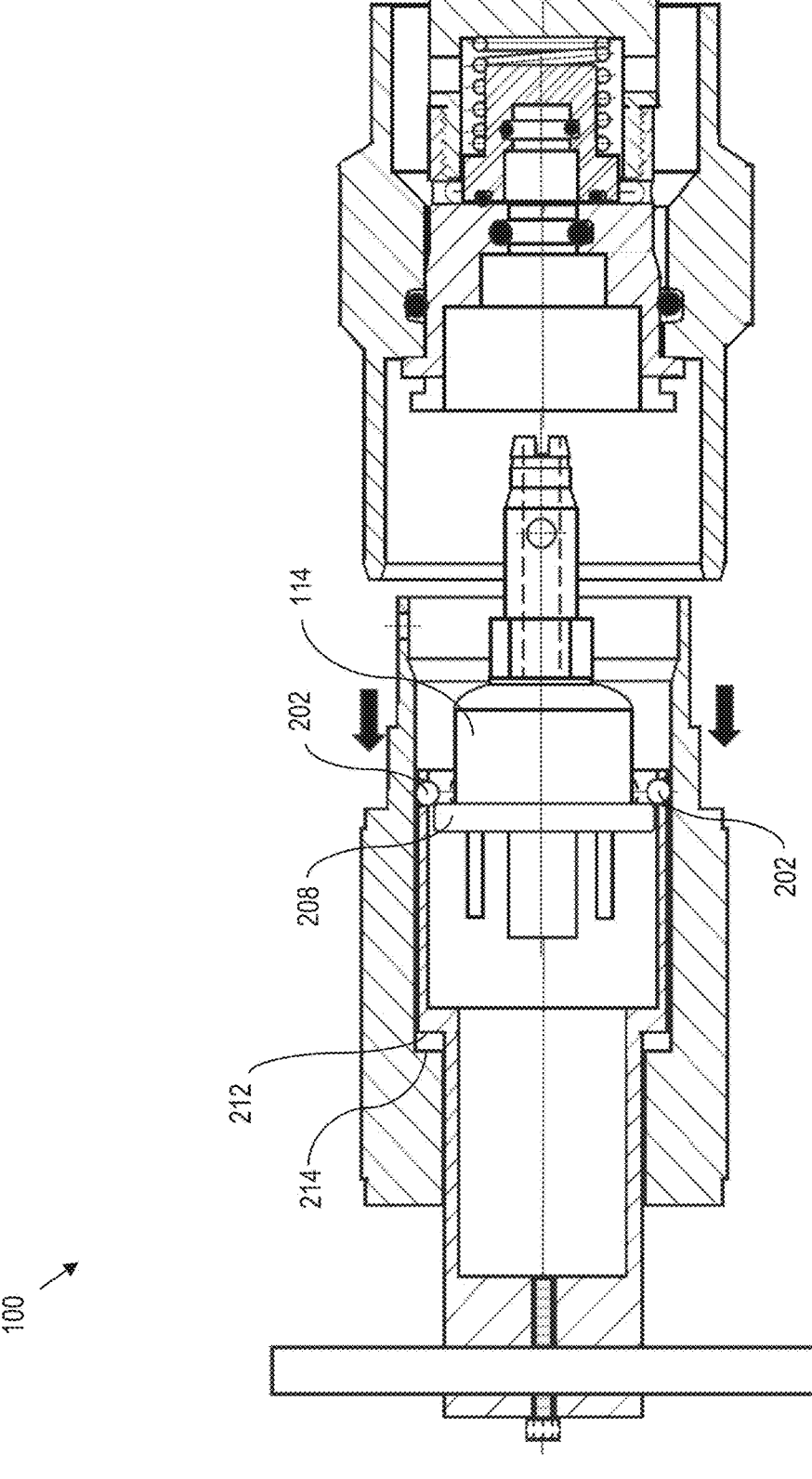
FIG. 10 is a drawing the pump-out valve of FIGS. 8-9, where the ball bearings are still gripping the vacuum gauge and the vacuum gauge is extracted, according to various aspects of the present disclosure.

FIGS. 8-10 illustrate a process for removing the vacuum gauge 114 from the pump-out valve embodiments described herein. FIG. 8 illustrates the pump-out valve 100 (including the removable operator 130) that functions similarly to the pump-out valves described above. In many embodiments, the piston 136 includes several ball bearings 202 that expand outward in a cutout 204 of the housing 132 when the operator 130 is coupled to the valve body 102. Only two ball bearings 202 are shown in FIG. 8, but any number may be used. For example, eight ball bearings may be used, each about an eighth of a way around the circumference of the piston 136.

FIG. 9 illustrates an intermediate step in removing the vacuum gauge 114 from the valve body 102. As the piston 136 of the removable operator 130 is pulled away from the valve body 102, the piston 136 slides along the housing 132, and the ball bearings 202 get pulled in to engage a lip 208 of the vacuum gauge 114. As the operator is pulled further, the piston 136 pulls out the vacuum gauge out of the valve body. Eventually, an under portion 212 of the piston 136 engages with a shelf 214 of the housing 132.

FIG. 10 illustrates a next step in removing the vacuum gauge 114 from the valve body 102. The ball bearings 202 remain in contact with the lip 208 of the vacuum gauge 114, and the under portion 212 of the piston 136 contacts the shelf 214 such that the housing is removed from the valve body as well.

Figure 11:
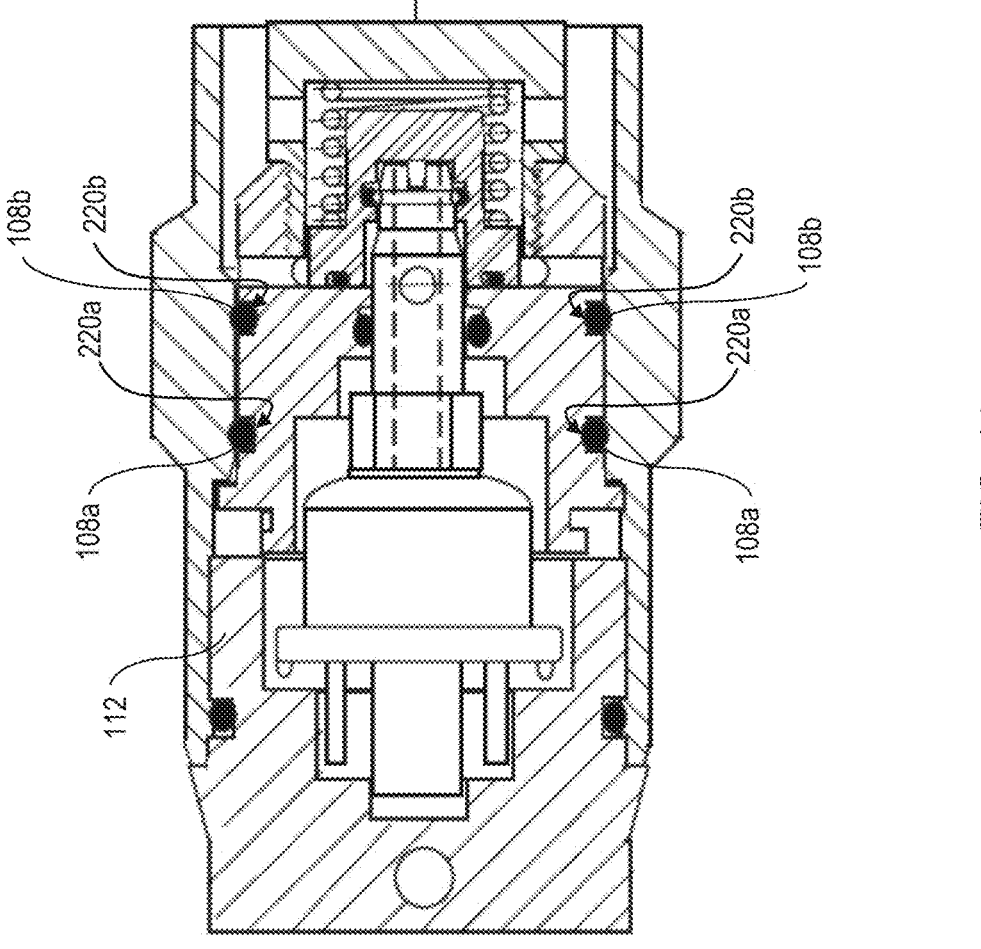
FIG. 11 is a drawing of another embodiment of the pump-out valve with two seals in recesses of a plug of the pump-out valve, according to various aspects of the present disclosure.

FIG. 11 is another embodiment of the pump-out valve 100. Comparing the embodiment of FIG. 11 to the embodiment of FIGS. 1-2, in FIGS. 1-2, the seal 108 is within a recess of the valve body. However, in FIG. 11, there are two seals 108a-b within recesses 220a-b of the plug 112, respectively. Having two seals 108a-b helps maintain a seal in the pump-out valve 100, and having the recesses 220a-b be within the plug 112 (as opposed to the valve body) allows for a larger bore (i.e., orifice) when venting, which allows for venting to occur at a better rate.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. Aspects of the disclosure were chosen and described in order to best explain the principles of the disclosure and the practical application, and to enable others of ordinary skill in the art to understand the disclosure for various embodiments with various modifications as are suited to the particular use contemplated.

What is claimed is:

1. A pump-out valve for a structure, wherein the pump-out valve comprising:
a valve body including a seal;
a plug assembly comprising:
a plug corresponding to the seal of the valve body; and
a vacuum gauge coupled to the plug; and
an operator that removably couples to the valve body, wherein the operator includes:
a housing;
an actuator coupled to the housing;
a piston that is removably coupled to the plug of the plug assembly; and
an outlet passage;
wherein:
the actuator is actionable to:
couple the piston to the plug assembly in a first position to allow for a user to use the actuator to:
set the pump-out valve to a sealed state by moving the plug assembly such that the plug assembly engages the seal of the valve body; and
set the pump-out valve to an open state by removing the plug from the seal of the valve body; and
decouple the piston from the plug in a second position to allow the operator to be removed from the valve body while the pump-out valve is in the sealed state.

2. The pump-out valve of claim 1, wherein the plug assembly further includes:
a vacuum-gauge-tube holder that houses a tube of the vacuum gauge;
a spring retainer that covers the vacuum-gauge-tube holder; and
a spring that surrounds the tube of the vacuum gauge within the vacuum-gauge-tube holder and is disposed between the vacuum-gauge-tube holder and the spring retainer.

3. The pump-out valve of claim 2, wherein:
the plug includes an opening; and
the spring:
biases the vacuum-gauge-tube holder to cover the opening of the plug when no outside force is placed upon the vacuum-gauge-tube holder; and
allows the vacuum gauge and the vacuum-gauge-tube holder to be pushed into the plug such that the opening of the plug allows pressure from outside the plug assembly to enter the plug assembly, which places the pump-out valve in a pressure-reading state.

4. The pump-out valve of claim 3, wherein:
the operator includes a compressor such that when the compressor acts upon a wall of the operator when the pump-out valve is set to the open state, the compressor pushes the vacuum gauge and the vacuum-gauge-tube holder to place the pump-out valve in the pressure-reading state.

5. The pump-out valve of claim 3, further comprising a cap that removably couples to the valve body to enclose the plug assembly while the operator is removed from the valve body.

6. The pump-out valve of claim 5, wherein the cap is a threaded cap and couples to the valve body via a threaded portion of the valve body.

7. The pump-out valve of claim 6, wherein the threaded cap pushes the vacuum gauge to place the pump-out valve in the pressure-reading state, when the threaded cap is coupled to the valve body.

8. The pump-out valve of claim 3, wherein a user manually pushes the vacuum gauge and the vacuum-gauge-tube holder to place the pump-out valve in the pressure-reading state.

9. The pump-out valve of claim 3, wherein the vacuum gauge includes a transmitter that transmits a reading of the vacuum gauge.

10. The pump-out valve of claim 9, further comprising a threaded cap that removably couples to the valve body via threads on the valve body to enclose the plug assembly while the operator is removed from the valve body; wherein the threaded cap pushes the vacuum gauge and the vacuum-gauge-tube holder to place the pump-out valve in the pressure-reading state, when the threaded cap is coupled to the valve body.

11. The pump-out valve of claim 10, wherein the transmitter is a wireless transmitter that wirelessly transmits the reading of the vacuum gauge over a wireless network.

12. The pump-out valve of claim 9, wherein the transmitter is a wireless transmitter that wirelessly transmits the reading of the vacuum gauge over a wireless network.

13. The pump-out valve of claim 1, wherein the seal resides in a recess of the valve body.

14. The pump-out valve of claim 1, wherein the seal resides in a recess of the plug.

15. The pump-out valve of claim 1, wherein the seal comprises two seals.

16. The pump-out valve of claim 15, wherein the two seals each reside corresponding recesses in the plug.

17. A pump-out valve for a structure, wherein the pump-out valve comprising: a valve body including a seal; a plug assembly comprising: a plug corresponding to the seal of the valve body, wherein the plug includes an opening; a vacuum gauge coupled to the plug, wherein the vacuum gauge includes: a wireless transmitter that wirelessly transmits a reading of the vacuum gauge over a wireless network; and a tube; a vacuum-gauge-tube holder that houses the tube of the vacuum gauge; a spring retainer that covers the vacuum-gauge-tube holder; and a spring that surrounds the tube of the vacuum gauge within the vacuum-gauge-tube holder and is disposed between the vacuum-gauge-tube holder and the spring retainer, wherein the spring: biases the vacuum-gauge-tube holder to cover the opening of the plug when no outside force is placed upon the vacuum-gauge-tube holder; and allows the vacuum gauge and the vacuum-gauge-tube holder to be pushed into the plug such that the opening of the plug allows pressure from outside the plug assembly to enter the plug assembly, which places the pump-out valve in a pressure-reading state; a cap that removably couples to the valve body via threads on the valve body to enclose the plug assembly, wherein the cap pushes the vacuum gauge and the vacuum-gauge-tube holder to place the pump-out valve in the pressure-reading state, when the cap is coupled to the valve body; and an operator that removably couples to the valve body, wherein the operator includes: a housing; a piston that is removably coupled to the plug of the plug assembly; an actuator coupled to the housing, wherein the actuator is actionable to: couple the piston to the plug assembly in a first position to allow for a user to use the actuator to: set the pump-out valve to a sealed state by moving the plug assembly such that the plug assembly engages the seal of the valve body; and set the pump-out valve to an open state by removing the plug from the seal of the valve body; and decouple the piston from the plug in a second position to allow the operator to be removed from the valve body while the pump-out valve is in the sealed state; and a compressor such that when the compressor acts upon a wall of the operator when the pump-out valve is set to the open state, the compressor pushes the vacuum gauge and the vacuum-gauge-tube holder to place the pump-out valve in the pressure-reading state; an outlet passage; and wherein the cap couples to the valve body when the operator is not coupled to the valve body.

18. A pump-out valve for a structure, wherein the pump-out valve comprising:

a valve body including a seal;
a plug assembly comprising:
   a plug corresponding to the seal of the valve body, wherein the plug includes an opening;
   a vacuum gauge coupled to the plug, wherein the vacuum gauge includes a tube;
   a vacuum-gauge-tube holder that houses the tube of the vacuum gauge;
   a spring retainer that covers the vacuum-gauge-tube holder; and
   a spring that surrounds the tube of the vacuum gauge within the vacuum-gauge-tube holder and is disposed between the vacuum-gauge-tube holder and the spring retainer, wherein the spring:
      biases the vacuum-gauge-tube holder to cover the opening of the plug when no outside force is placed upon the vacuum-gauge-tube holder; and
      allows the vacuum gauge and the vacuum-gauge-tube holder to be pushed into the plug such that the opening of the plug allows pressure from outside the plug assembly to enter the plug assembly, which places the pump-out valve in a pressure-reading state;
a cap that removably couples to the valve body to enclose plug assembly;
an operator that removably couples to the valve body, wherein the operator includes:
   a housing;
   a piston that is removably coupled to the plug of the plug assembly;
   an actuator coupled to the housing, wherein the actuator is actionable to:
      couple the piston to the plug assembly in a first position to allow for a user to use the actuator to:
         set the pump-out valve to a sealed state by moving the plug assembly such that the plug assembly engages the seal of the valve body; and
         set the pump-out valve to an open state by removing the plug from the seal of the valve body; and
      decouple the piston from the plug in a second position to allow the operator to be removed from the valve body while the pump-out valve is in the sealed state; and
   a compressor such that when the compressor acts upon a wall of the operator when the pump-out valve is set to the open state, the compressor pushes the vacuum gauge and the vacuum-gauge-tube holder to place the pump-out valve in the pressure-reading state; and
an outlet passage.

* * * * *